Feb. 10, 1942. T. A. BOWERS 2,272,631
PISTON RING AND EXPANDER
Filed Sept. 6, 1939  2 Sheets-Sheet 1

Inventor
Thomas A. Bowers
by
Attorney

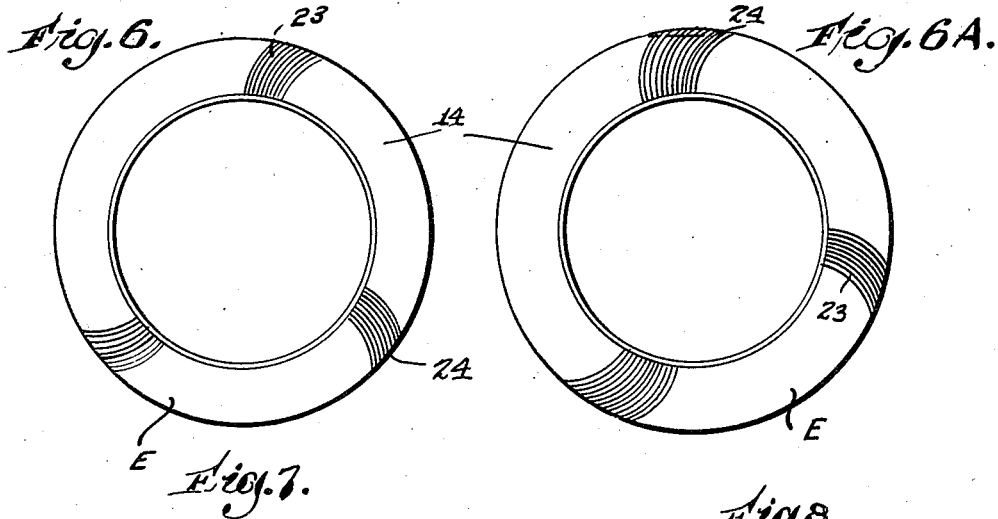
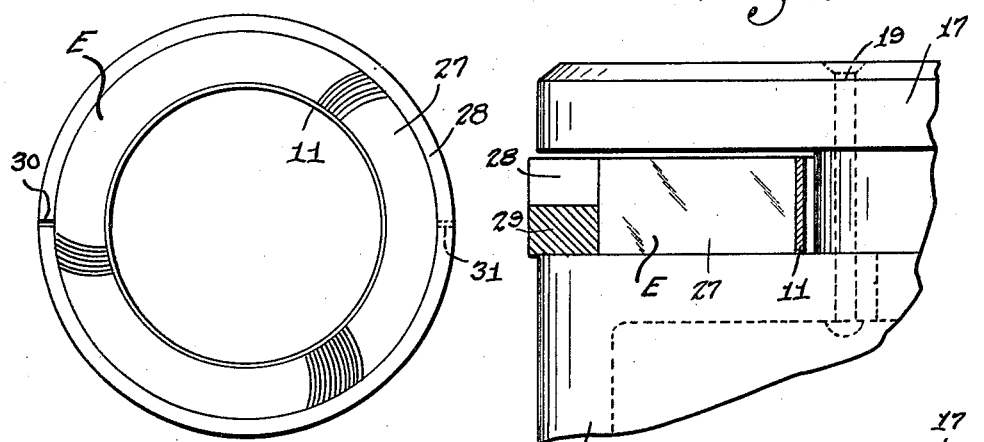
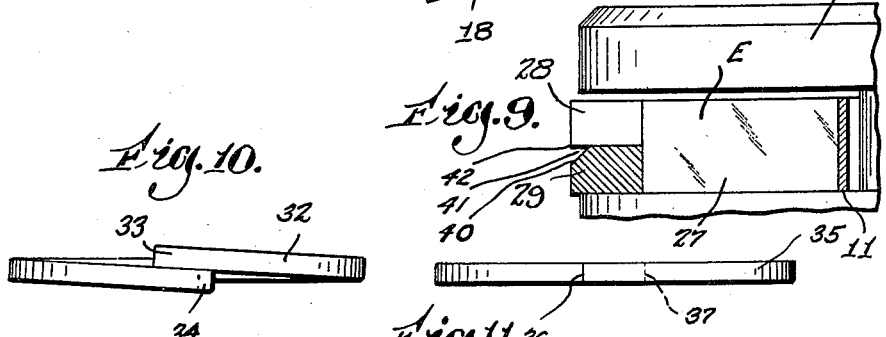

Patented Feb. 10, 1942

2,272,631

UNITED STATES PATENT OFFICE 2,272,631

PISTON RING AND EXPANDER

Thomas A. Bowers, Boston, Mass., assignor to Power Research Corporation, Boston, Mass., a corporation of Massachusetts Application September 6, 1939, Serial No. 293,546

6 Claims. (Cl. 309—45)

This invention relates to piston rings and more especially to piston ring expanders and is a continuation in part of my copending application Ser. No. 198,263, filed March 26, 1938.

It is a chief object of the invention to improve the operation of piston rings, having in mind particularly split rings of the class generally referred to as C-type piston rings, and to devise novel expander means for a piston ring assembly with a view to reducing cylinder wear and improving and rendering more uniform, effective and lasting the sealing contact and expansibility of rings on cylinder peripheries particularly those which are worn out-of-round or tapered. The invention also aims to provide a novel and efficient oil control ring assembly capable of functioning as an oil ring and compression ring.

Attainment of these and other objects of the invention will be readily understood from the following description when read in connection with the accompanying drawings and the novel features will be more clearly pointed out in the appended claims.

In the drawings:

Fig. 6 and Fig. 6A are plan views illustrating rings finished according to the steps illustrated in Figs. 1-4 inclusive, and further indicating changes resulting from compressing a ring of spiral formation.

Fig. 7 is a plan view illustrating a piston ring assembly including the spirally formed structure illustrated in Figs. 1-6 inclusive.

Fig. 8 is a fragmentary view in elevation and partial cross section illustrating the association of a ring assembly such as that shown in Fig. 7 with a piston.

Fig. 9 is a view similar to Fig. 8 and is intended to illustrate the association of spirally formed ring material with a modified type of piston ring.

Fig. 10 is a view in side elevation illustrating another modification of ring which may be desired to be employed; and Fig. 11 is a side elevation of still another modification of ring.

Referring in detail to the drawings, Figs. 1-6 inclusive relate to the construction of spirally formed rings of material which are adapted to comprise expander members. Figs. 7-11 inclusive relate to association of the expanders with various types of piston rings to comprise novel piston ring assemblies.

Figure 2:
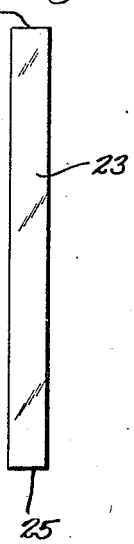
Fig. 2 is a view in side elevation of a strip similar to that shown in Fig. 1.
Figure 3:
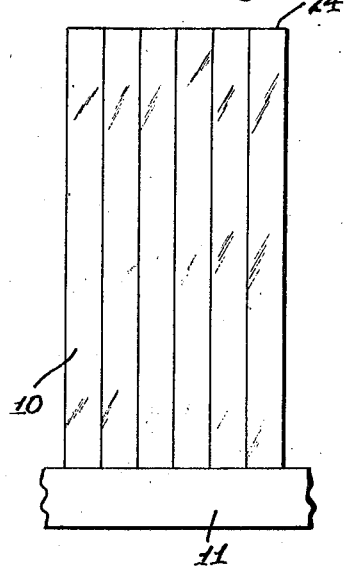
Fig. 3 is another elevational view fragmentarily indicating a number of strips secured together on a base and illustrating a step in the formation of my improved ring material.
Figures 4, 5:
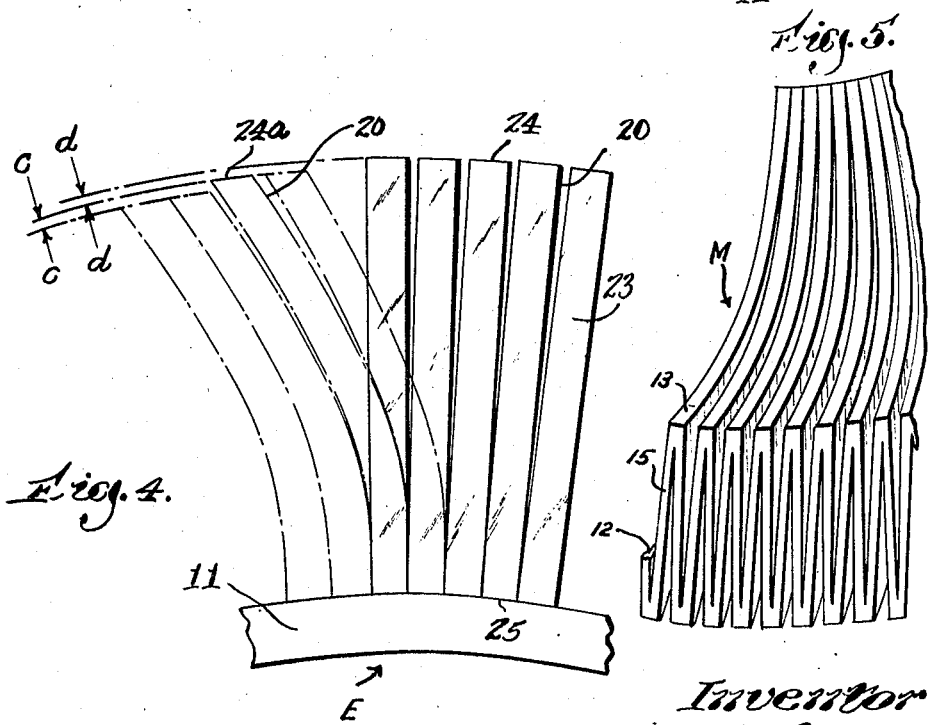
Fig. 4 is a view somewhat similar to Fig. 3 illustrating in broken lines the step of forming the strips in a spiral manner.
Fig. 5 is a perspective view illustrating a modification of spirally formed piston ring material.

In the construction shown in Figs. 1-4 and Fig. 6, numeral 10 indicates a strip of material employed in constructing one type of expander member. A plurality of the strips 10 are secured together along one side to a base 11 and bent over upon one another along an opposite side to provide a spirally formed body and comprise expander members E such as have been illustrated in Fig. 6. In this modification, the strips 10 take their position in a ring in such a manner that the longer edges 23 comprise the top and bottom surfaces of the expander E. Those edges indicated at 24 will comprise the outer periphery and edges 25 are united along the base 11 and together with the base comprise the inner periphery of the expander. By giving the strips 10 the spiral set referred to, it may be readily seen that a substantial radial resiliency is developed between the inner perimeter and the outer perimeter of the ring. Fig. 4 indicates at the arrows $c$ and $d$ the relative decrease in radial width which occurs when the sheets are bent over from a radial position to a spiralled position. Fig. 6 and Fig. 6A illustrate the changing sizes which may occur by varying the amount of spiral. This radial resiliency makes possible a novel expander member.

In Figs. 7-11 inclusive, association of expanders, such as that indicated in Fig. 6, or other forms later to be described, have been illustrated with other piston ring members, to comprise a novel piston ring assembly. One example of ring assembly consists in the arrangement shown in Figs. 7 and 8, in which two cast iron C-type rings 28 and 29 have been assembled one upon another and engaged around the expander. An advantage resulting from this ring assembly is that the gaps 30 and 31 may be so positioned with relation to one another that each ring seals the gap of the other, and if desired the two rings may be secured to one another as by pinning in a position where this is accomplished. If desired, other types of piston rings may be employed as for example the fabricated ring of my earlier patent, No. 2,076,544, April 13, 1937, or I may desire to employ only one C-type ring. In such instance, the size and shape of the expander will be changed during its construction. A discussion of the expander, together with advantages resulting from its association with other rings, follows.

The strips 10 may be of any material which is suitable for the particular packing expander use for which it is intended. For instance, in forming a piston packing ring I may make use of a thin steel strip. Other materials such as nickel, alloys, or plastics may be used and the size and shape of the sheets may vary according to the ring proportions.

It may be advantageous in making up a piston ring to provide a great many interstices or openings between strips and to attain this objective relatively thin strips may be employed. As an instance of a desirable strip thickness there may be cited a figure of .001 of an inch. It should be understood, however, that the thickness of the metal strips may be increased or decreased as required. By employing thinner and more flexible metal strips, the wall pressure may be reduced. Conversely, by using thicker and stiffer strips, the wall pressure may be increased.

Figure 1:
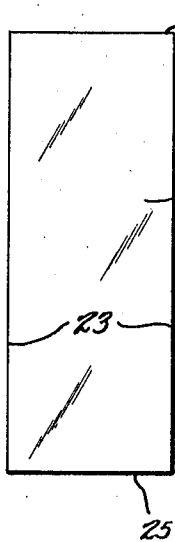
Figure 1 is a view showing in elevation a strip of piston ring material similar to strips used in the formation of my improved piston ring assembly.

A plurality of strips similar to those illustrated in Figs. 1 and 2 are provided in some convenient manner as for instance by stamping them out of a length of ribbon stock into a magazine. These sheets may then be associated together in any one of several ways. For example, a straight length of material may be prepared by solidly mounting a plurality of the pieces on a base 11, as by soldering or welding. If desired, the pieces may be grouped in an annular rack and soldered or welded together in this position, with other base means being utilized, or no base may be used at all and the strips may be secured to one another at their ends while grouped in the annular position referred to.

In Fig. 3 I have illustrated the strips assembled on base 11 in a straight line. A length of material of a size determined by the diameter of the ring desired to be made may then be bent around to form a circular body as has been fragmentarily indicated in Fig. 4. The circular body so formed may be joined together at the ends to form an unbroken ring or may be left with the ends free. The roughly assembled ring thus formed may then be placed in a die which has its inner periphery tapered. The ring is slightly rotated in this die whereby the strips 10 are bent over upon one another into a spiral position, and the ring is then forced down through the die which sets the strips in their spiralled formation and tends to decrease the radial width of the ring. Thereafter grinding or other well known finishing operations may be effected if desired.

I may provide an expander of spirally formed construction by other means. For example, in Fig. 5 I have illustrated a length of material 12, reversely folded upon itself to comprise crown-forming portions 13 and web-forming portions 15. Both crowns 13 and webs 15 may be provided with a spiral formation in the manner already described as by the use of the dies above referred to to effect the spiralled material M. It will be noted that with the spirally formed material M, it is not necessary to employ the base 11 to secure the strips and yet the strips are spirally formed at their outer ends as shown to comprise a structure substantially equivalent to that shown in Fig. 4.

Attention is particularly directed to the radial resiliency of these structures. It should be noted that the dimension of the outer perimeter of a length of this spiralled material may vary while the dimension of the inner perimeter remains relatively constant. It follows, therefore, that if the inner perimeter of a length of the material constitutes an unbroken circular body, as the base 11, the outer perimeter of the ring may vary and the inner perimeter must remain at one fixed value. As a result, a structure made up of an inner zone and an outer zone is provided which is resilient to forces radially directed against the outer zone of the body but which is resistant to and substantially unchanged by all forces directed against the inner zone. Application of such a ring structure to a cylinder provides a resilient wall pressure uniformly distributed all the way around the ring, and the outer perimeter of the ring yields to irregularities in the cylinder periphery without change in the inner perimeter. Also, the outer perimeter of the expander engages against a comparatively large amount of the inner periphery of the seating member and this results in a reduction of back pressure acting on the ring since the available surface area on which it can be effective has been reduced.

It will be observed that a clearance space has been provided between the base 11, referred to as representative of any form of inner perimeter for the packing, and the piston groove. This enables the packing to function in conventional manner relatively to the piston. That is, the piston is free to move in and around the packing, thereby minimizing the effect of "piston slap" tending to wear a cylinder out-of-round.

The spiral construction effected by bending the strips 10 over upon themselves results in the ends of the spirally bent portions of the strip being angularly presented to the cylinder periphery. This may be more clearly seen upon reference to Fig. 4 in which it will be noted that the thickness of the end 24 of any one of the strips, measured squaredly thereacross, is its smallest dimension. If this end is laid over and presented to a ring periphery at any angle, a new and relatively larger end dimension may be present such as the edge 24-a shown in broken lines in Fig. 4. The strips are therefore presented, and tend to wear, along this greater dimension when in the spirally bent position. Each strip acts somewhat like a lever being held at its inner end and tending to spring outward to a degree determined by the spiral set given. It should also be observed that the spirally-bent structure may retain oil films in the interstices 20 between the sheets and may under some conditions comprise a substantially fluid-tight body.

In Figs. 10 and 11, I have illustrated modified C-type rings which may be used in place of either rings 28 or 29. These comprise a ring 32 (Fig. 10) formed with one end 33 adapted to overlap the other 34 occurring one above the other as shown; also a ring 35 (Fig. 11) with ends 36 and 37 overlapping and the ends further falling in the same horizontal plane. Either of these rings when stretched over a piston and about the spiral structure tends to shrink and cling to the spiral structure to effect improved association therewith.

It should be observed that the expander member such as the expander E may comprise a continuous body which may or may not resist the passage of gas through its interstices 20; or it may comprise an open or interrupted structure formed from sections of the spiralled strips supported on a ring base. It is pointed out that when the expander of substantially solid form is employed, it resists the passage of gases through the interstices between the sheets or strips, and a novel sealing or protecting action occurs, with the inner periphery of the sealing ring no longer being subjected to the fluctuating pressure of combustion gases in the manner customary with conventional expanders. The expanding action of the expander E is of novel character in that it provides for a definite expanding force acting against the inner periphery of a sealing ring. The amount of expanding is limited by the amount of contraction of the outer perimeter of the expander E relative to its inner perimeter when compacted against the inner periphery of a sealing ring in a cylinder. It is also pointed out that not only is there a definite range of expanding attained but the expanding action is uniform at all points around the inner periphery of the sealing member, with the result that if the sealing member comprises a C-type ring with a gap, the usual tendency of such rings, to open up upon expansion and become more tightly pressed against the cylinder wall at one side than another, is greatly reduced.

A further modification of piston ring with which my improved expander may be associated comprises a special oil handling structure such as has been shown in Fig. 9 in which it will be seen that the rings 28 and 29 have again been employed in the manner already described. However, the lower ring 29 is provided with an opening occurring from effecting a beveled edge 40 on the outer periphery of the ring 29 at points adjacent the under side of ring 28. This provides a reservoir 41 for holding oil which may be distributed along a cylinder wall as the piston moves upwardly. By providing a reservoir 41, the lower edge 42 of the upper ring 28 is relieved and is in a suitable position to effect desirable oil scraping on a cylinder while on the down stroke of the piston. By this means, there may be effected a combination compression ring and oil ring since no substantial passing of combustion gas can occur as for instance through the top gap 30 and then around the reservoir 41 through gap 31. The reason is that the oil in the reservoir will substantially prevent any passage of gas therethrough. It will be understood that the beveled edge 40 shown in Fig. 9 is illustrative of various recessed conditions which may be desired to be effected in either one or both of the sealing rings and I may wish to form other types of openings for providing oil reservoirs and exposing scraping edges.

It will be seen that with my novel expander member, I have improved and made more uniform the sealing action of C-type piston rings. Also, an expander member has been provided which in addition to developing a predetermined amount of expansibility tends to minimize the effect of gas pressure and the occurrence of tapered cylinder wear. Further, a novel oil control ring has been devised, which may be combined with a sealing member.

While I have shown a preferred embodiment of my invention various changes may be desired to be resorted to in keeping with the spirit of the invention, as for instance a ring may be employed using sections of the spirally formed strips or the strips may be made smaller in the form of bristle-like elements.

I claim:

1. A piston ring assembly comprising in combination a plurality of split piston rings mounted one above the other, the gaps of said rings being out of vertical alignment, an expander ring located around the inner periphery of said split rings, said expander comprising a plurality of resilient elements secured together along one side and bent over upon one another in a spiralled manner, said expander engaging in said split rings in a compressed state and being of a height substantially equal to the combined height of the said split rings thereby to uniformly expand each of said rings.

2. A piston ring assembly comprising in combination a sealing ring and an expander ring located within said sealing ring, said expander ring comprising a plurality of resilient strips disposed upon their edges and secured together at their inner ends, said strips being spirally bent, thereby forming a radially compressible and expansible annular body which is resistant to the passage of gases axially between the strips.

3. A piston ring assembly comprising in combination a plurality of sealing rings mounted one above the other, the gap of one of said rings occurring out of alignment with the gap of the other of said rings; an expander ring located within said sealing rings, said expander comprising a plurality of resilient strips secured together and bent over upon one another in spiral formation, said strips occurring with a height such that the ends thereof engage against each of the sealing rings and uniformly expand same.

4. A piston ring assembly comprising in combination a piston ring adapted to engage against a cylinder wall and expander means located around the inner periphery of the ring, said expander means comprising a substantially solid annular body formed of a plurality of strips of resilient sheet material, said strips being disposed on edge and secured together to constitute the inner periphery of the annular body, said strips further being bent over upon one another circumferentially to provide a compacted structure which is resistant to passage of gases axially through it, and said expander being engaged in sealed relation with the said piston ring.

5. A piston ring assembly comprising in combination a sealing ring and an expander member, the ends of the sealing ring normally occurring in overlapping relation with respect to one another, and adapted to compressibly engage with the said expander member, said expander member comprising a plurality of resilient strips secured together at their inner ends and being bent over upon one another circumferentially to provide a radially expansible annular body adapted to expand the said sealing ring.

6. A piston ring assembly comprising in combination a split sealing ring and an expander member engaged around the inner periphery of the sealing ring in sealed relation thereto, said expander comprising an annular body made up of a plurality of resilient strips disposed on their edges and secured together at their inner ends, the outer ends of the strip being bent over upon one another in overlapping relation, said strips being substantially resistant to axial passage of gases therebetween for the purpose of eliminating gas pressure at the inner periphery of the said sealing ring.

THOMAS A. BOWERS.